United States Patent
Kojima et al.

[11] Patent Number: 5,825,853
[45] Date of Patent: Oct. 20, 1998

[54] COMMUNICATION DEVICE

[75] Inventors: Noboru Kojima, Yokohama; Toshiro Kamiuchi, Tokyo; Juichi Morikawa, Tottori; Yoshito Nejime, Koganei, all of Japan

[73] Assignee: Hitachi, Ltd., Tokyo, Japan

[21] Appl. No.: 707,506

[22] Filed: Sep. 4, 1996

[30] Foreign Application Priority Data

Sep. 7, 1995 [JP] Japan ..................... 7-230331
Sep. 19, 1995 [JP] Japan ..................... 7-240056

[51] Int. Cl.⁶ ........................... H04M 1/64
[52] U.S. Cl. ................ 379/67; 379/76; 455/412
[58] Field of Search ............... 379/67, 88, 89, 379/76, 77; 455/412, 413

[56] References Cited

U.S. PATENT DOCUMENTS

| | | | |
|---|---|---|---|
| 4,612,416 | 9/1986 | Emerson et al. | 379/88 |
| 4,805,207 | 2/1989 | McNutt et al. | 379/89 |
| 4,853,952 | 8/1989 | Jachmann et al. | 379/88 |
| 4,860,339 | 8/1989 | D'Agosto | 379/67 |
| 5,003,577 | 3/1991 | Ertz et al. | 379/89 |
| 5,029,200 | 7/1991 | Haas et al. | 379/89 |
| 5,632,002 | 5/1997 | Hashimoto et al. | 379/88 |

FOREIGN PATENT DOCUMENTS

| | | |
|---|---|---|
| A-1-93795 | 4/1989 | Japan . |
| A-1-200299 | 8/1989 | Japan . |
| A-5-80796 | 4/1993 | Japan . |
| A-5-241598 | 9/1993 | Japan . |
| A-6-202691 | 7/1994 | Japan . |

Primary Examiner—Fan S. Tsang
Attorney, Agent, or Firm—Frohwitter

[57] ABSTRACT

A communication device having an automatic answering telephone function which can record a message spoken by a sender in a record/reproduction part when there is an incoming signal in an automatic answering mode and also which can interlacedly reproduce only head parts of messages when the received message is to be reproduced. The communication device, which further has a speech processing part for changing a speech rate while keeping a speech pitch constant, can reproduce a recorded message at a speech rate designated by a user and can transmit a rate-changed speech message.

3 Claims, 7 Drawing Sheets

COMMUNICATION DEVICE

CROSS-REFERENCE TO RELATED APPLICATION

This application relates to U.S. patent application Ser. No. 07/931,375 on Aug. 18, 1992, and assigned to the present assignee. The content of that application is incorporated herein by reference.

BACKGROUND OF THE INVENTION

1. Field of the Invention

The present invention relates to communication devices which have a speech-rate conversion function and more particularly, to a communication device which performs its speech-rate converting operation at the time of reproducing a recorded speech message and of transmitting a speech message to another communication device.

2. Description of the Related Art

With respect to speech-rate conversion, in such a speech reproduction device for reproducing a voice or speech signal obtained from a microphone or the like, there is known a technique by which a fundamental waveform (periodic waveform) of the speech signal repeated at regular intervals is extracted, a periodic waveform is inserted into the extracted fundamental waveform without collapsing its period, or the periodic waveform is deleted to thereby change the rate of the speech signal without changing the pitch of the speech, as disclosed in a journal "Nikkei Electronics", an article entitled "Rate Conversion Technique Put Into Practical Use —basic function of speech output device—", No. 622, 1994, 11.20.

Meanwhile, communication devices have been developed in increasing the number of their functions. As a result, a communication device has, in addition to its original function of two-way interaction on a real time basis through communication line, a function of recording and reproducing a speech message or messages in and from an automatic answering telephone. However, the communication device has no such a search function as to listen preferentially to necessary one or ones of a number of messages recorded in the automatic answering telephone.

There is also suggested such a technique that, when it is desired to execute data communication between two communication devices, one of the communication devices on the transmitter side compresses data and transmits the compressed data to the other speech communication device as the receiver, whereas, the receiver communication device expands the received data to obtain its original data, whereby the quantity of such data as to be transmitted onto a communication line can be decreased. Such known data compression/expansion methods include a differential transmission method of transmitting a differential value between adjacent sampled data, a method of restricting a speech band, a method of shifting a quantization range according to a speech amplitude, and an MPEG-1 method. These methods, however, have a problem that, so long as the speech data compressed and transmitted based on these methods is not subjected by the receiver-side communication device to a digital processing based on the expansion method associated with the compression method, it is impossible to obtain audible data from the compressed speech data.

SUMMARY OF THE INVENTION

It is therefore an object of the present invention to provide a communication device wherein an operator can efficiently listen to desired one of a number of speech messages recorded therein at a desired speed.

Another object of the present invention is to provide a communication device which, when it is desired to transmit or receive a speech message to or from another speech communication device via a communication line, can reduce the quantity of communication or traffic regardless of the type of the receiver-side communication device and also can reproduce the received speech message at a desired speed.

In accordance with the present invention, the above objects can be attained by providing a communication device which comprises a response message generation part for sending a preset response message to a message sender in a signal reception mode, a record/reproduction part for recording and reproducing a speech message received from the message sender after the response message generation part sends the response message to the message sender, an input part for instructing a reproduction method, reproduction rate and transmission rate for the message, and a speech processing part for converting the speech rate.

The record/reproduction part, according to the reproduction method instructed by a user through the input part, continuously reproduces preset parts of messages or reproduces a specified message fully.

The speech processing part includes a silent-period detection/deletion part for detecting a silent part in the speech message and removing it therefrom and a speech-rate conversion part for converting the speech rate of the speech message. When it is desired to reproduce and transmit the speech message, the silent-period detection/deletion part and/or the speech-rate conversion part performs their operation over the speech message.

The speech-rate conversion part includes a speech pitch detection part for extracting a periodic waveform from the speech signal as a speech pitch, and a speech pitch number processing part for intermittently thinning out or inserting the periodic signal waveform extracted by the speech pitch detection part from or in its original speech data.

The communication device of the present invention may further comprise a transmitter for transmitting a message together with a compression rate of the message and a receiver for separating a received signal into a message and a compression rate.

DESCRIPTION OF THE PREFERRED EMBODIMENTS

An embodiment of the present invention will be detailed with reference to the accompanying drawings.

A communication device in accordance with the present invention comprises a telephone set, a cellular telephone set, a personal computer having a communication function, or the like; whereas a communication line is of an analog or digital type. In the present invention, explanation will be made in connection with a telephone set.

Figure 1:
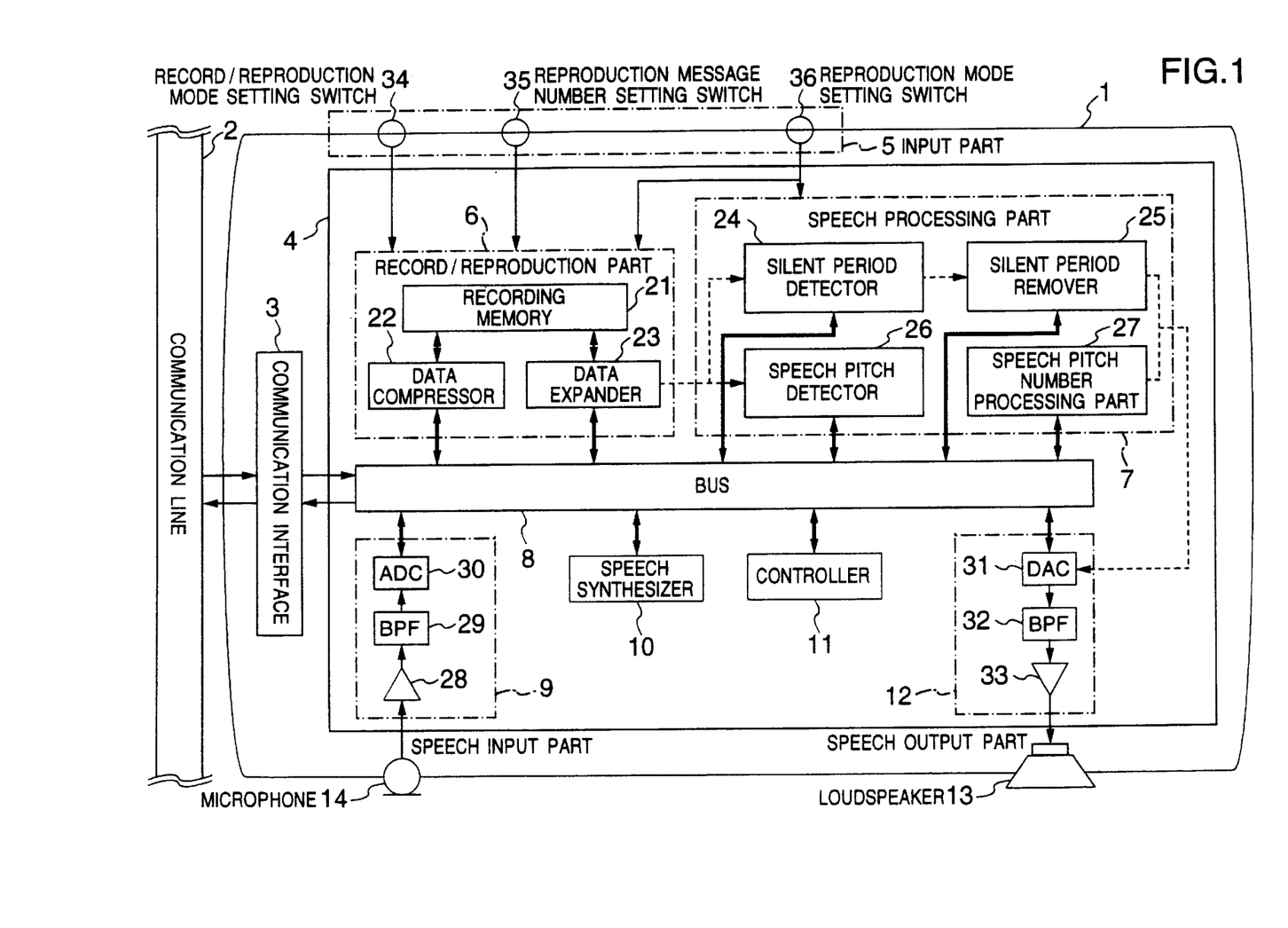
FIG. 1 is a block diagram of a schematic arrangement of a communication device in accordance with the present invention.

FIG. 1 shows an arrangement of an automatic answering telephone set. Among the functions of the automatic answering telephone set, ones (such as a calling function of calling a speech party using a dial and an incoming-call informing function using a bell) which are usually provided but which do not form a featured part of the present invention, will not be explained herein, and only one which forms the featured part of the present invention will be explained.

A telephone set 1 includes a communication interface 3 and a speech signal processor 4.

The communication interface 3 connects a line 2 to the speech signal processor 4.

The speech signal processor 4 has an input part 5 for inputting user's instruction indicative of message reproduction or so on, a record/reproduction part 6 for recording and reproducing a message or messages, a speech processing part 7 for performing its speech processing operation over a message to be reproduced, a microphone 14 for inputting a speech signal, a speech input part 9 for processing the speech signal, a speech synthesizer 10, a speech output part 12 for processing a speech signal to be output, a loudspeaker 13 for sounding the output speech signal, a bus 8 connected between these constituent elements, and a controller 11 for controlling the entire data flows of the respective elements.

The speech input part 9 functions to perform its initial processing operations (such as band limiting operation and A-D conversion) over a speech signal received from the handset transmitter (microphone) 14. The speech input part 9 is made up of an input buffer amplifier 28, a band pass filter (BPF) 29 for band limitation, and an analog-digital converter (ADC) 30 for converting an analog signal to a digital signal.

The speech synthesizer 10, which generates a message speech signal or the like as a response, is made up of a speech synthesizing data memory and a digital signal processor (DSP) for speech synthesis or made up of a central processing unit (CPU).

The record/reproduction part 6 has a recording memory 21 for storing therein digital speech data. The recording/reproducing part 6 may have a data compressor 22 for compressing data to save memory capacity and a data expander 23 for expanding data to its original form at the time of reading out data from the memory 21. The data compression and expansion is based on a Lempel-Ziv (LZ) method, Huffman method or similar method, all of which are generally known in the art. The data compressor 22 and data expander 23 may be implemented in the form of an exclusive processor or in the form of a combination of a CPU provided within the controller 11 and suitable software.

The speech processing part 7, which functions to perform its speech pitch number converting operation (i.e., speed-rate converting operation) and silent period removing operation over a speech signal reproduced and output by the record/reproduction part 6, is made up of a speech pitch detector 26 for detecting the pitch of a periodic waveform of the speech signal, a speech pitch number processing part 27 for inserting and/or thinning out the periodic wave of the speech signal, a silent period detector 24, and a silent period remover 25. How the speech processing part 7 performs the above operations will be explained later. These operations are implemented by the exclusive processors provided within the respective parts or the processor provided within the speech processing part 7 or controller 11, and by the associated software.

The input part 5 has a record/reproduction mode setting switch 34, a reproduction message number setting switch 35, and a reproduction mode setting switch 36. In the case of the telephone set, these switches may be realized in the form of exclusive pushbuttons. Alternatively, this may be realized by displaying numbers corresponding to the above switches in a menu format on a liquid crystal display mounted on the telephone set and by entering desired one of the switch numbers with use of the dial numeric pushbuttons.

The speech output part 12, which acts to output digital speech data processed by the above means to the handset receiver (loudspeaker) 13, is made up of a digital-analog converter (DAC) 31 for converting the processed digital speech data to analog speech data, a band pass filter (BPF) 32 for band limitation.

In FIG. 1, two-arrowed lines depicted by thick solid lines are indicative of digital data transmission lines connected between the respective signal processing parts and the bus 8. Arrowed lines depicted by thin solid lines are indicative of flows of speech signals. Arrowed dotted lines are indicative of processing flows between the respective signal processing means.

Explanation will now be directed to the speed-rate converting operation and silent period removing operation to be executed by the speech processing part 7.

The speech pitch detector 26 detects the pitch of the periodic waveform of the input speech data. The silent period detector 24 detects, as a silent period, a period of the input speech data during which its speech level is equal to or lower than a predetermined level. When the speech pitch detector 26 detects the periodic waveform of the speech signal, the speech pitch number processing part 27 inserts or removes the periodic waveform into or from the original speech signal without changing the pitch interval of the periodic waveform.

Figure 2:
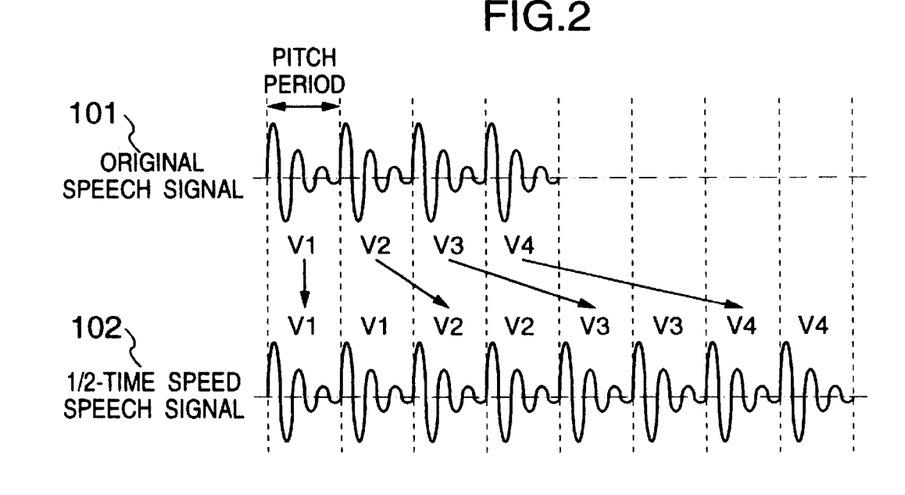
FIG. 2 is a diagram for explaining the principle of "slow speech" conversion based on a speech-rate conversion function.

FIG. 2 is a diagram for explaining the principle of lowering a speech rate. An original speech signal 101, when subjected to an insertion of periodic waveforms, can be converted to a "slow speech" signal 102 whose periodic waveform pitch number is increased and thus whose speech duration is expanded. Consider, for example, a vowel of the original speech signal 101 having such periodic waveforms V1 to V4 as shown in FIG. 2. In this case, when each of the periodic waveforms V1 to V4 is inserted twice for each pitch, a resultant vowel periodic waveform becomes twice in periodic waveform duration without changing the original pitch interval. As a result, the original speech signal 101 can be converted to the "slow speech signal" 102 having a speech rate corresponding to nearly ½ of that of the original speech signal 101 without changing the original pitch. In this connection, with respect to how to insert the periodic waveform, for example, a waveform obtained by arithmetically operating the waveforms before and after the inserted waveform may be employed.

Figure 3:
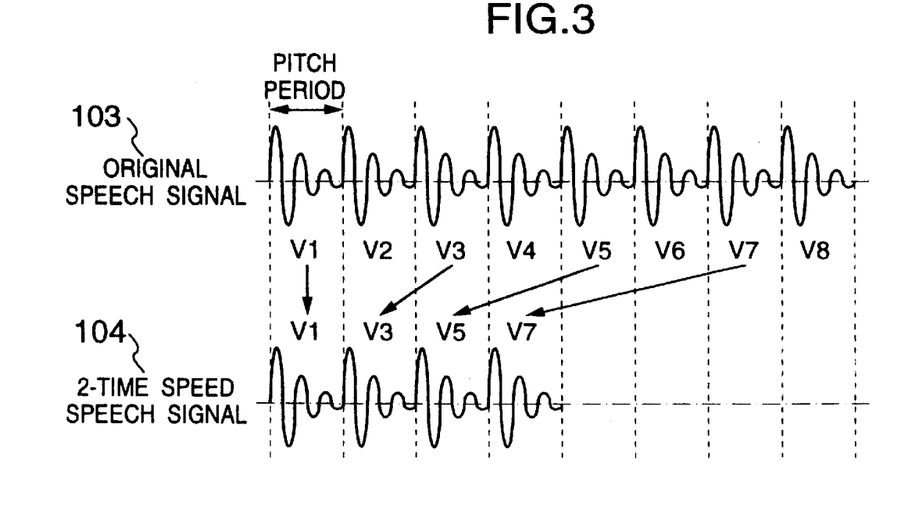
FIG. 3 is a diagram for explaining the principle of "fast speech" conversion based on the speech-rate conversion function.

Shown in FIG. 3 is a diagram for explaining the principle of increasing the speech rate of a speech signal. In this case, when a suitable number of periodic waveforms are removed from an original speech signal 103 of a vowel, there can be obtained a resultant "fast speech" signal 104 which has a periodic waveform duration corresponding to about ½ of that of the original speech signal 103 without changing the original pitch, as shown in FIG. 3. In this connection, when the cycle of the speech data to be guided to the speech processing part 7 is increased about twice simultaneously with the above operation, the resultant speech message can be reproduced in ½ time length when compared with the absence of such a cycle increase.

Figure 4:
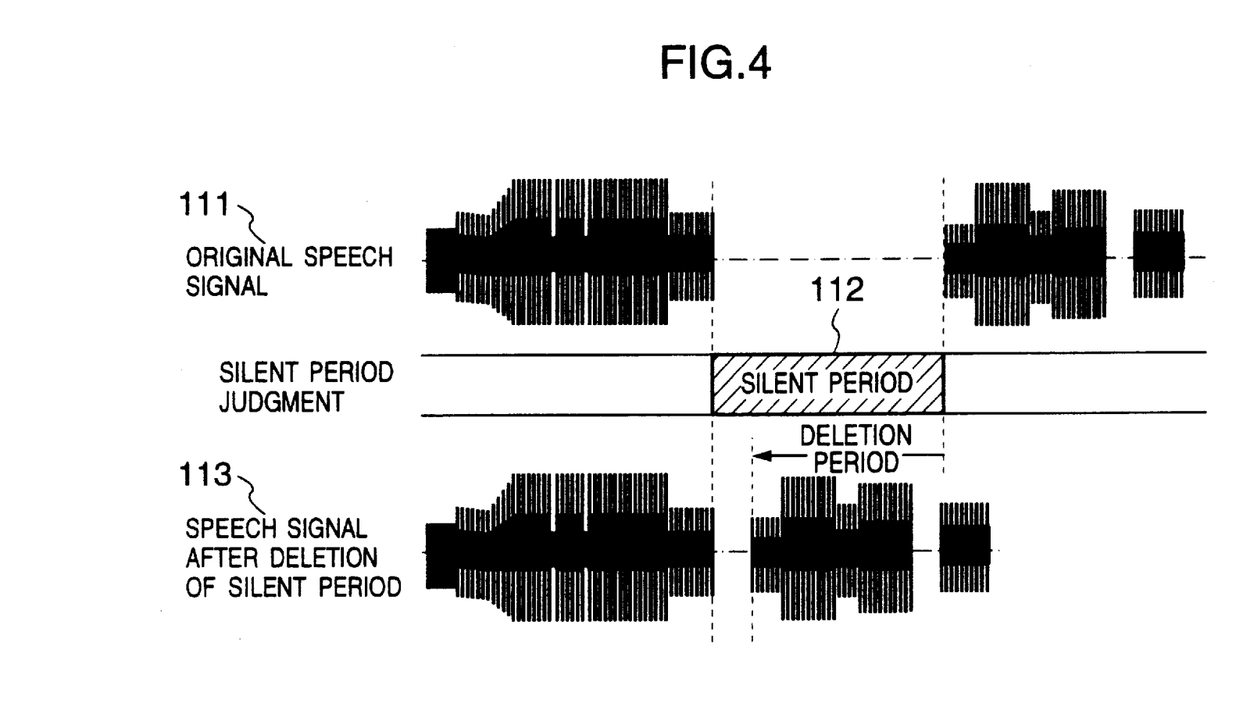
FIG. 4 is a diagram for explaining the principle of a silent period removing function.

FIG. 4 is a diagram for explaining how to detect and remove a silent period in a speech signal. More specifically, when the silent period detector 24 detects a silent period in the received speech signal, the silent period remover 25 deletes part or all of the silent period in an original speech signal 111. For example, the silent period detector 24 judges the presence or absence of a silent period 112 on the basis of the magnitude of energy of the original speech signal 111, as shown in FIG. 4. That is, the silent period detector 24 judges, as a silent period, a region in which the speech energy is equal to or less than a predetermined constant level. And the silent period remover 25 removes part or all of the judged silent period from the original speech signal 111. As a result, there can be obtained a speech signal 113 which is shorter than the original speech signal 111 and which has the silent period removed therefrom. The percentage of a duration to be removed may be determined according to the increased speech rate.

Such signal processing operations are also described even in the earlier-mentioned article entitled "Rate Conversion Technique Put Into Practical Use—basic function of speech output device—".

These speech-rate converting operation and silent period removing operation can be carried out on a real time basis, which can prevent generation of such an extent of time lag that can be recognized by human's ear. The processed signal can be made audible only when it is subjected to a digital-analog conversion and then sent to the loudspeaker.

The operation of the telephone set 1 will be explained in connection with its modes.

(1) Normal Communication Mode

For user's ordinary speech, the microphone 14 converts the user's speech to an analog speech signal and outputs the analog speech signal to the speech input part 9. In the speech input part 9, the speech signal is passed through the input buffer amplifier 28 and sent to the BPF 29 to be band-limited, after which a resultant signal is sent to the ADC 30 to be converted therein to digital speech data. Thereafter, the digital speech signal is transmitted onto the bus 8. The communication interface 3 receives the speech data from the speech input part 9 via the bus 8 and transmits it to an other party through the line 2. Concurrently with it, the communication interface 3 also receives speech data from the speech party through the input buffer amplifier 28, and outputs it to the speech output part 12 as it is via the bus 8. The speech output part 12 performs such processings as D-A conversion, band limitation and amplification over the received speech data (digital) to obtain an analog speech signal, and then outputs the analog speech signal to the handset receiver (loudspeaker) 13. The handset receiver (loudspeaker) 13 converts the received analog speech signal to voice and sounds it.

In the case where the communication line 2 is of an analog type, the communication interface 3 performs its digital-analog conversion over transmission data and also performs its analog-digital conversion over received data. In the case where the communication line 2 is of a digital type, the communication interface 3 performs its encoding and framing operations over transmission data and also performs its deframing and decoding operations over received data depending on the type of the communication line used.

(2) Message Record Mode

In the case where a message record mode is designated to the record/reproduction part 6 by the record/reproduction mode setting switch 34, if the communication device receives an incoming signal, then the speech synthesizer 10 generates a response message previously set and transmits the message to the other party through the communication interface 3 and line 2. The communication interface 3 also outputs the incoming speech data (message spoken by a speaker as the signal sender) to the record/reproduction part 6 through the bus 8. The record/reproduction part 6 compresses the received speech data at the data compressor 22 and sends it to the recording memory 21 to be stored therein. This recording operation can be possible not only in a user absence mode (automatic answering mode) but also in a normal communication mode.

Figure 5A:
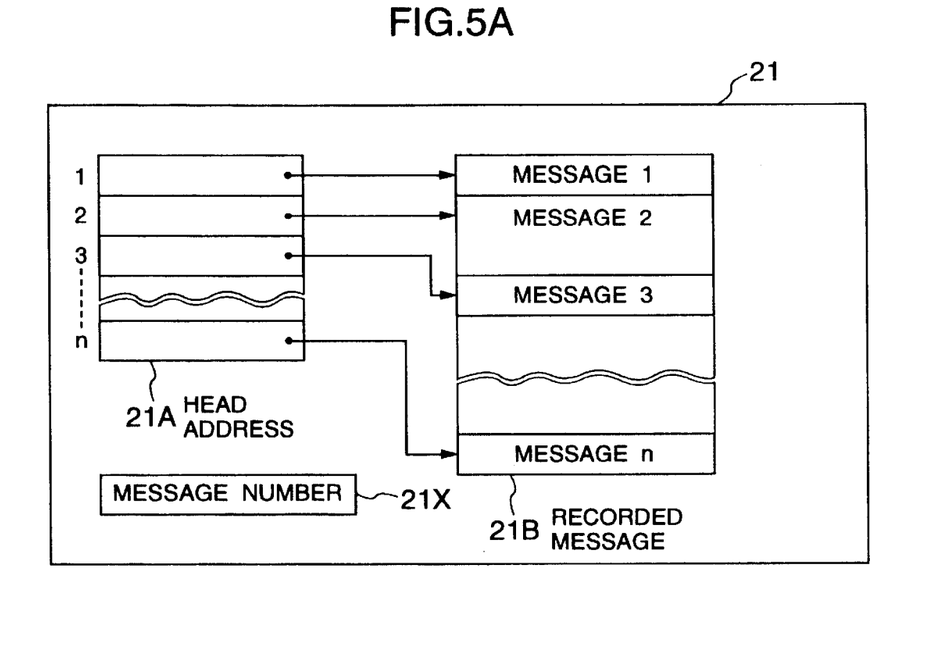
FIGS. 5A and 5B show data structures of a recording memory respectively.
Figure 5B:
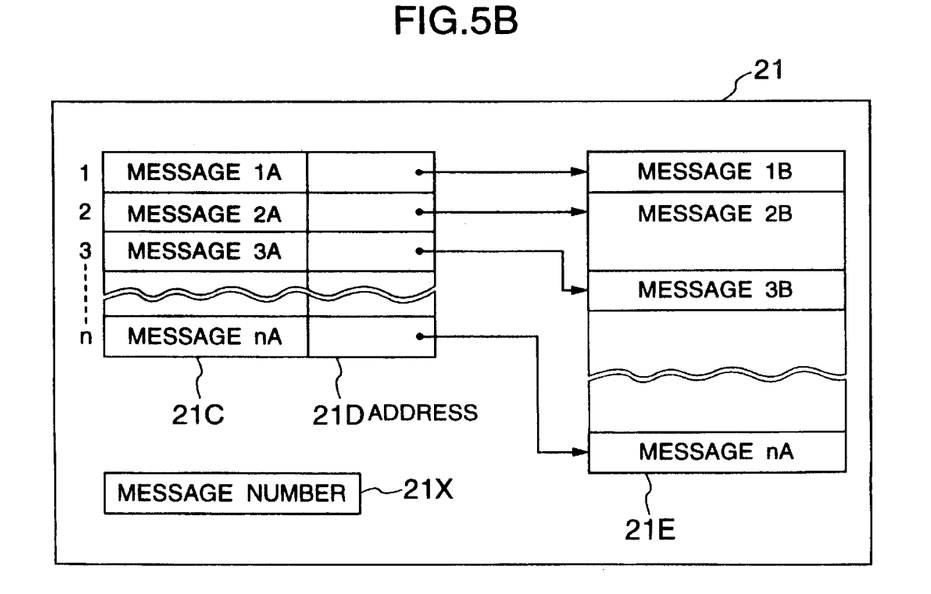

FIGS. 5A and 5B show examples of a data structure of the recording memory 21. The recording memory 21 stores therein a plurality of messages having different lengths. In FIG. 5A, messages are sequentially stored in an area 21B, while head addresses of the respective message are stored in an area 21A. In FIG. 5B, initial fixed-length parts of messages are stored in an area 21C, the remaining parts thereof are stored in an area 21E, and start addresses of the remaining parts are stored in an area 21D. In either of FIGS. 5A and 5B, the current number of stored messages (referred to merely as the current stored message number, hereinafter) is stored in an area 21X so that, when a maximum stored message number n is already equal to the current stored message number at the time of receiving an incoming signal or when the area 21B or 21E is full, the telephone set informs the signal dispatcher or sender of the fact that the memory cannot store any messages by means of a response message.

(3) Message Reproduction Mode

When a message reproduction mode is designated to the record/reproduction part 6 by the record/reproduction mode setting switch 34, the messages already recorded in the recording memory 21 are reproduced.

In the message reproduction mode, the user can designate a message reproduction rate and a message reproduction method to the reproduction mode setting switch 36 and reproduction message number setting switch 35 respectively.

The reproduction rate is divided into three reproduction rate modes which follow.

In a normal reproduction rate mode, first, the speech messages recorded in the memory are reproduced and output as they are.

In a slow reproduction rate mode, second, the speech messages recorded are subjected to a speech-rate converting operation so that the messages are reproduced and output with the pitch not changed and with only the speech rate made slower. This mode is convenient when the user wishes to listen to the speech messages while making a memo of the contents thereof or when the user wishes to listen to the messages while having a sure grasp thereof.

In a fast message reproduction mode, third, the speech messages recorded in the memory are subjected to a speech-rate converting operation so that the messages are reproduced and output with the pitch not changed and with only the speech rate made faster. In the fast message reproduction mode, the operation of removing a silent period is also carried out so that the user can efficiently listen to the speech messages.

The reproduction method is divided into three approaches or ways which follow.

In a sequential reproduction way, first, all the messages recorded in the recording memory 21 are sequentially reproduced.

In a search reproduction way, second, in view of the fact that senders' names and messages' subjects are generally described at the beginning of most speech messages, the head parts of the plurality of messages recorded in the recording memory 21 are reproduced only in several seconds (referred to as the interlacing reproduction, herein) in the message reproduction mode. A message number being reproduced may be informed to the user in the form of a synthesized voice before or after the reproduction of each message, may be displayed on a display screen of a telephone set, or may be informed to the user in the form of a flashing pushbutton.

In a number reproduction way, third, the messages designated in numbers alone are reproduced.

The reproduction rates can be arbitrarily combined with the reproduction ways.

The messages recorded in the recording memory 21 may be all erased when the record/reproduction part 6 is again put in the record mode or may be erased in response to user's instruction.

Figure 6:
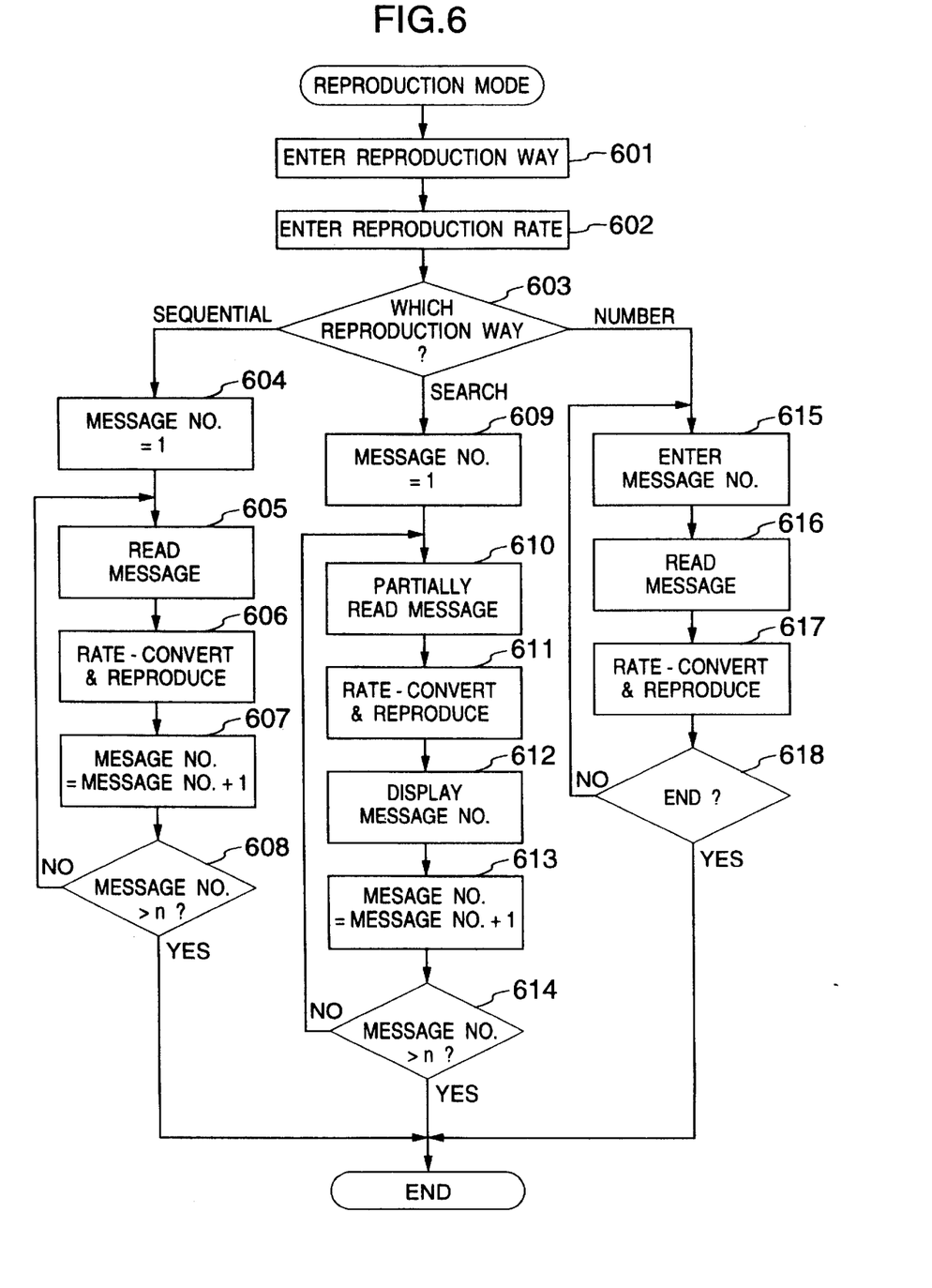
FIG. 6 is a flowchart showing a reproduction algorithm of a speech message recorded in the memory.

Shown in FIG. 6 is a flowchart showing the operations executed by the record/reproduction part 6, speech processing part 7 and controller 11 in the reproduction mode.

When the user sets the message reproduction mode, the communication device prompts the user to select one of the message reproduction ways (sequential, search and number) and one of the reproduction rate modes (slow, normal and fast) and in response to it, the user designates desired one respectively (steps 601 and 602). In this case, if there is no user's input in a fixed time (for example, in 3 seconds), then the communication device may regard it, by default, as designation of the sequential message reproduction way and the normal message reproduction mode. The next operation is branched into 3 according to the designated message reproduction way (step 603).

In the sequential way, the first message is read out from the recording memory 21 (steps 604 and 605). In the slow or fast rate mode, the message is subjected to a speech rate conversion and a reproduction by the speech processing part 7; while, in the normal mode, the message is sent and reproduced to and in the speech processing part 7 in the form of its data without any change (step 606). Thereafter, all the messages are repetitively subjected to the same operations as the above (steps 607 and 608).

The operation in the search way (steps 609 to 614) is substantially the same as that in the sequential way, except that, when the messages are read out from the recording memory 21, the messages are read out not by their full lengths but only by a predetermined fixed length from the heads thereof (step 610) and then subjected to a rate converting operation and a reproducing operation (step 611). FIGS. 5A and 5B show the structural examples of the recording memory 21, wherein FIG. 5B is when the search mode is taken into consideration, i.e., only the area 21C having the head parts of the messages stored therein is to be reproduced. During, before or after the reproduction, a message number to be reproduced is displayed or informed to the user in the form of a voice (step 612). This operation is repetitively carried out over all the messages (steps 613 and 614).

In the number way (steps 615 to 618), the communication device prompts the user to enter a message number to designate the message number (step 615). After that, the message corresponding to the designated message number is fully read out from the recording memory (step 616) and then subjected to the speech-rate converting operation and reproducing operation (step 617). The communication device prompts the user to enter another message number for another message. When the user enters the message number, the operations of the steps 615 to 617 are repeated. In the absence of the entrance of the message number in a fixed time or when the user instructs the end, this causes the operation to be terminated (step 618).

The above reproducing operation can be modified into the following patterns.

The rate mode may be divided not only into the above 3 types of modes but also into more than 3 types of modes of ½-, ⅔-, 1-, 3/2-, 2-time rates . . .

The rate mode not only may be designated at the time of setting the reproduction mode but also may be freely modified during the reproducing operation.

In the search way, after the reproduction of the head part of each message is completed (following the step 611), the communication device may ask the user whether to reproduce the remaining part of the message and, in response to user's instruction, the communication device may reproduce the remaining part of the message.

In the search way, after all the messages are processed (after the step 614), the communication device may be automatically shifted to the processing of the number mode (step 615).

Explanation has been made in connection with such a technique that the incoming messages are recorded and later reproduced. Explanation will next be made as to such a technique that a message to be transmitted is subjected to a speech-rate converting operation.

The speech-rate conversion may be carried out over a message during conversation with the party on a real time basis, or the message may be once recorded and later the conversion may be carried out in its transmission mode. This can be realized by adding switches indicative of transmission ways (real-time transmission, and record/transmission) in the input part 5 of FIG. 1 and then by the user designating either one of the transmission ways.

Figure 7:
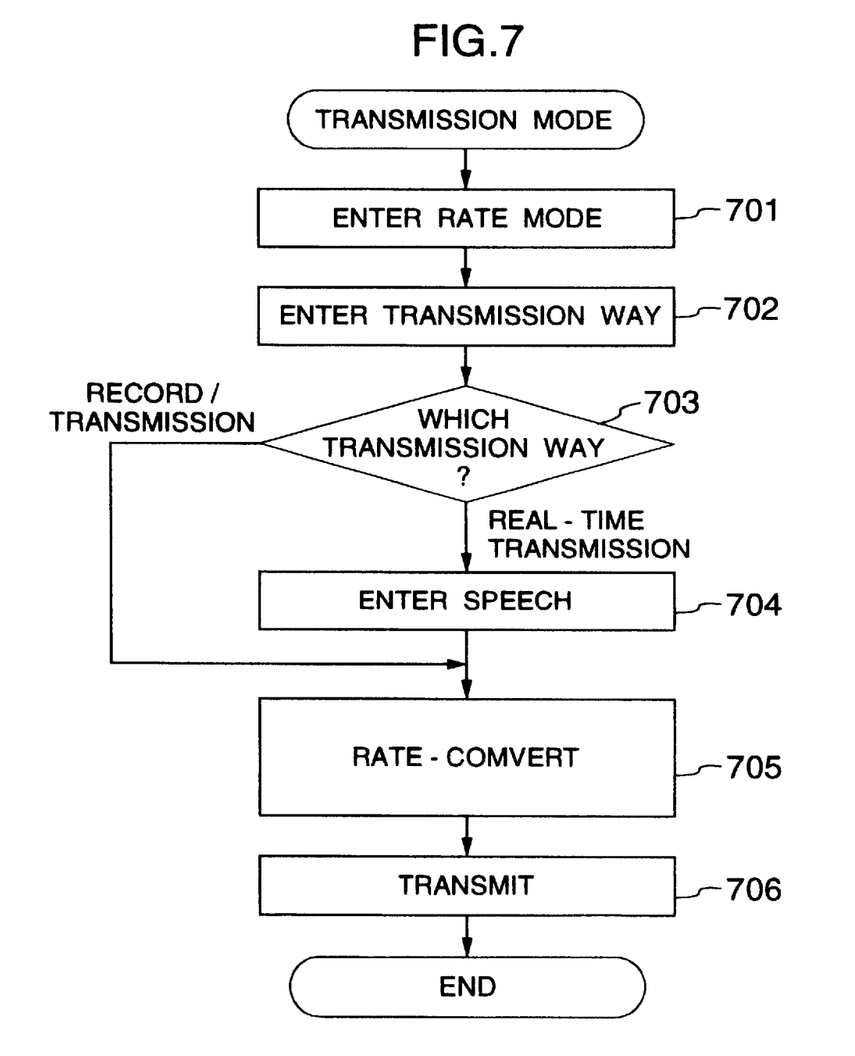
FIG. 7 is a flowchart showing a transmission algorithm of a speech message recorded in the memory.

FIG. 7 is a flowchart showing the operations to be executed by the record/reproduction part 6, speech processing part 7 and controller 11 in the transmission mode.

When the user sets the transmission mode, the communication device prompts the user to select and designate one of the rate modes (slow, normal and fast) and one of the transmission ways (record/transmission and real-time transmission) (steps 701 and 702). In this case, the absence of user's input in a fixed time (for example, in 3 seconds) may cause the communication device to take, by default, the normal rate mode and the record/transmission way. The next operation is branched into 2 patterns according to the transmission way (step 703).

In the real-time transmission way, a speech is input from the speech input part (step 704) and the message once converted to a digital signal is stored in the recording memory 21. In the record/transmission way, the messages previously stored in the recording memory 21 are utilized.

One of the messages is read out from the recording memory 21. In the slow or fast rate mode, the message is subjected by the speech processing part 7 to the speech-rate conversion and sent to the communication interface 3 through the bus 8; whereas, in the normal rate mode, the data of the message is sent as it is to the communication interface 3 through the bus 8 (step 705). Thereafter, the message is transmitted from the communication interface 3 to the other party telephone set through the line 2 (step 706).

The operation of the communication interface 3 can be divided into 3 patterns depending on the type of the communication line 2 and on the type of the other party telephone set.

When the communication line 2 is of an analog type, the communication interface 3 converts a digital signal received from the bus 8 into an analog signal and transmits the analog signal onto the line 2 as it is.

When the communication line 2 is of a digital type, the communication interface 3 once receives a signal from the bus 8 and performs its encoding and framing operations over the received signal depending on the type of the communication line.

In the case where the communication line 2 is of the digital type and the other party telephone set is of the same type as the sender side, the communication interface 3 receives, in addition to a speech signal to be transmitted, a rate mode from the bus 8 and performs its encoding and framing operations over the received speech signal depending on the type of the communication line. In this case, the rate mode is multiplexed with the speech signal and then transmitted. The rate mode may be attached to the head part of the speech signal as fixed-length data. When subjected to the framing operation, the rate mode may set in an idle area of the header of the frame.

Since the type of the communication line is determined when the telephone set is installed, the user sets the type of operation to be executed by the communication interface 3 at the time of installing the telephone set.

Although the operation varies also with the other party telephone set, the user may enter the type of the other party telephone set or whether or not the party telephone set is of the same type as the sender side in the transmission mode. In the case of the data type wherein the rate mode is set in an[]idle area of the frame header, the transmitting operation can be commonly used independently of the type of the other party telephone set.

Figure 8:
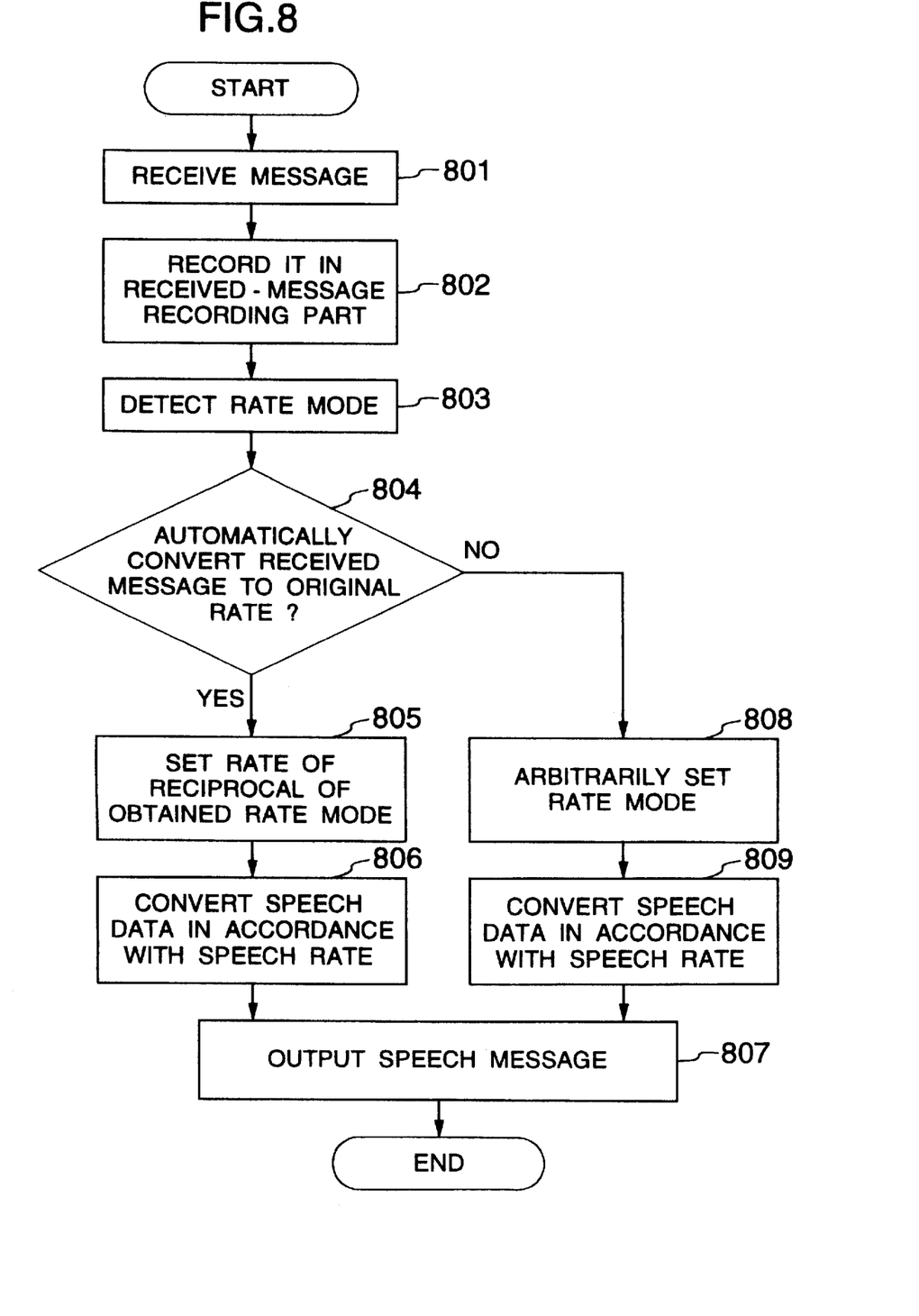
FIG. 8 is a flowchart showing a reception algorithm of a speech message.

Shown in FIG. 8 is the message receiving operation when the communication line is of a digital type and when the party telephone set is of the same type as the sender telephone set. This operation is executed by the communication interface 3, record/reproduction part 6, speech processing part 7 and controller 11.

More in detail, a message received from the communication line 2 is first subjected at the communication interface 3 to deframing and decoding operations (step 801), so that a speech message in the received message is recorded in the recording memory 21 (step 802) and a rate mode therein is sent to the speech processing part 7 (step 803).

Whether to restore the received message to its original rate one is asked to the user through such a display as the liquid crystal display of the telephone set, and the user answers to it by pushing an associated pushbutton (step 804) Selection of "YES" at the step 804 causes a reciprocal of the speech rate of the rate mode to be set (step 805) so that the received message once stored in the recording memory 21 is subjected to a speech-rate conversion (step 806). For example, if the rate mode is the fast mode (two-time rate), then the received message is converted to ½-time rate one, i.e., the original rate one.

Selection of "NO" at the step 804 allows the user to select a reproduction rate with respect to the original rate (step 808). The reciprocal of the speech rate of the rate mode received together with the message is multiplied by the speech rate of the rate mode selected by the user to perform the rate conversion over the received message read out from the recording memory 21 (step 809). For example, when the rate mode of the received message is the fast mode (two-time rate) and the rate mode selected by the user is the slow mode (½ time rate), the received message is converted to (½×½)-time rate one.

The message subjected to the rate conversion is sent to the speech output part 12 and then output from the loudspeaker 13 (step 807).

In FIG. 8, it is unnecessary that the reception, record and reproduction be continuous with respect to time, and only the reproduction may be carried out in another procedure.

When "NO" is determined in the step 804 of FIG. 8, the received message may be voice-output as it is without being subjected to any rate conversion.

When recording areas for the rate modes of the respective received messages are provided in the recording memory 21 shown in FIGS. 5A and 5B, the messages subjected to the rate conversion may be stored together with the associated rate modes. In the reproduction mode, the associated rate mode of the message can be utilized to restore the message to its original rate one.

Although the above explanation has been made in connection with the telephone set in the foregoing, the present invention can be similarly applied even to personal computer communication and television conference systems, and the speech message may be added as multiplexed with still and moving images.

What is claimed is:

1. A communication device connected to a communication line, comprising:

response message generation means for sending a preset response message to a speech message dispatcher when a call incomes;

record/reproduction means, after said response message generation means sends said response message to the dispatcher, for recording and reproducing a speech message received from the dispatcher;

input means for inputting user's instruction on reproduction, wherein said record/reproduction means, when instructed by the user through said input means to perform search-reproduction operation, performs its reproducing operation over only respective head parts of all recorded speech messages, silent-period detection/deletion means for detecting a silent period in the speech message and shortening or removing said silent period; and speech rate conversion means for performing its speech rate conversion over the speech message, wherein, when reproduced by said record/reproduction means, said speech message is processed by at least one of said silent-period detection/deletion means and said speech-rate conversion means, and wherein said speech-rate conversion means includes speech pitch detection means for extracting a periodic signal waveform from a speech signal as a speech pitch; and speech pitch number processing means for intermittently removing from original speech data the periodic signal waveform extracted by said speech pitch detection means and for intermittently inserting the periodic signal waveform into the original speech data.

2. A method for reproducing a plurality of messages in a communication device having said messages recorded therein, comprising the steps of:

inputting user's instructions on a reproduction method and a reproduction rate;

when the instructed reproduction method is indicative of search, converting only head parts of all messages recorded in said communication device to messages having the instructed reproduction rate and then reproducing head parts; and when the instructed reproduction method is indicative of a rate designation and reproduction, converting the entire message corresponding to a message number designated by the user into a message having the instructed reproduction rate and then reproducing the message.

3. A message reproducing method as set forth in claim 2, wherein a message rate conversion is carried out by extracting a periodic waveform from a message as a speech pitch and by periodically removing or inserting the periodic waveform from or into the original message.

* * * * *